Nov. 21, 1939.  M. J. BOGGIA  2,180,333
LUGGAGE RACK
Filed Oct. 4, 1938
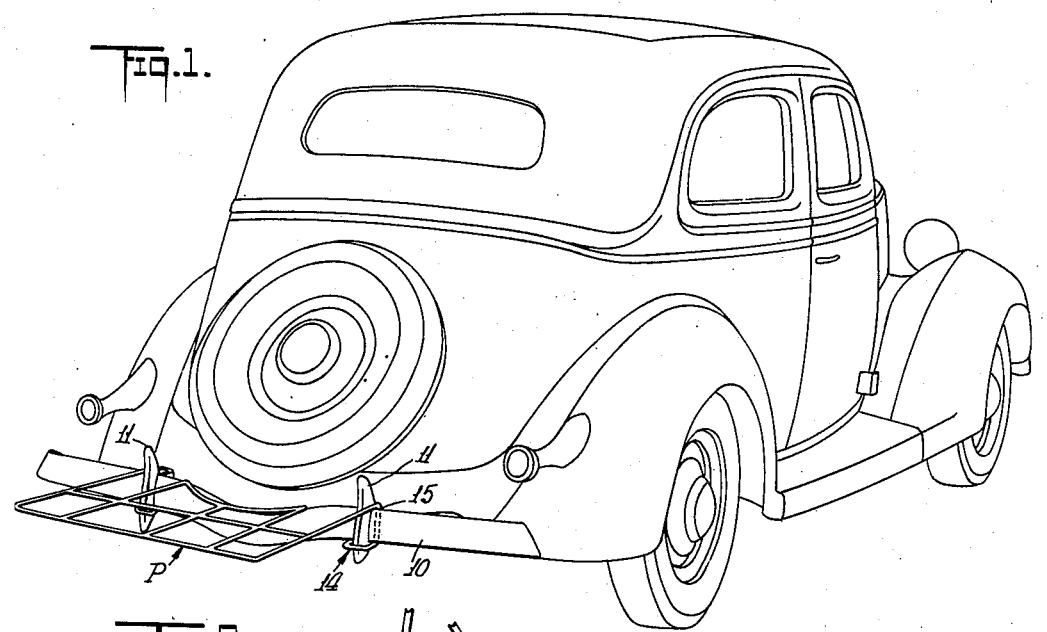
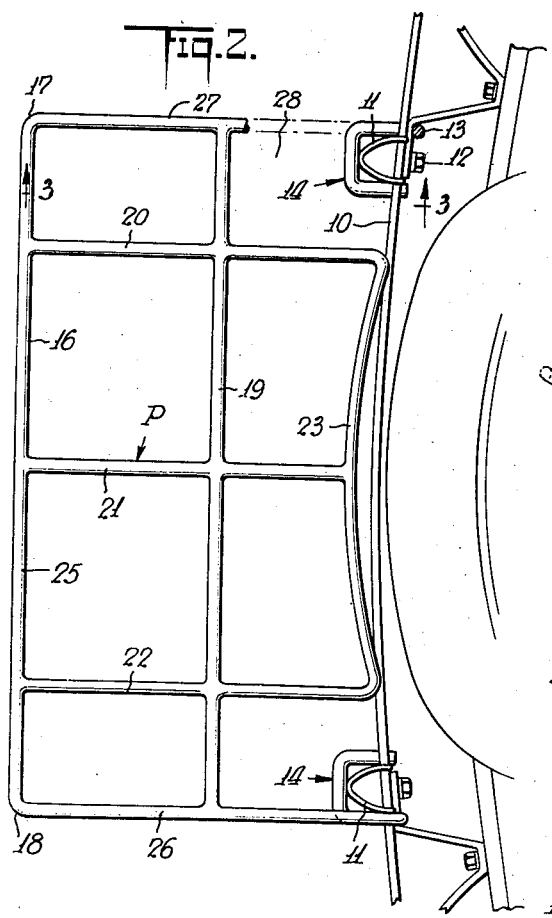
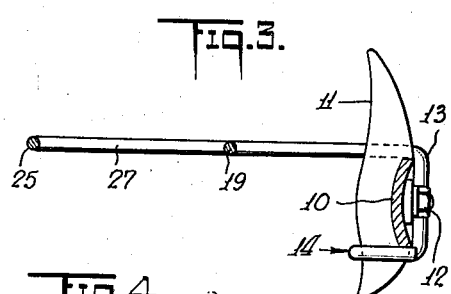
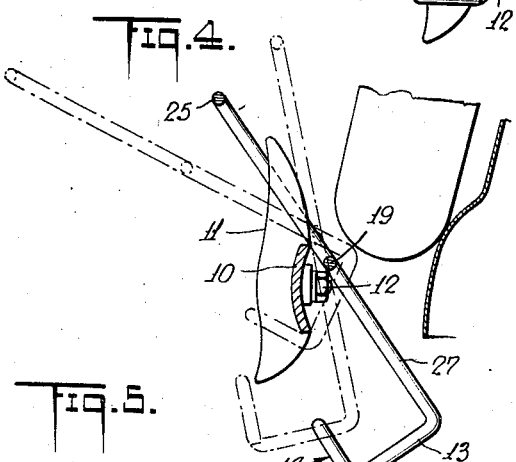
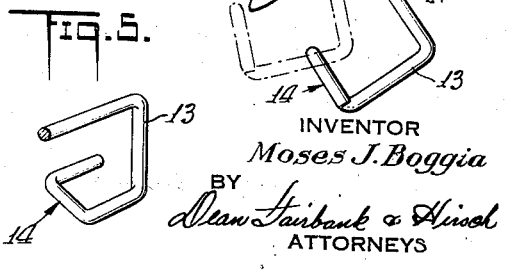
INVENTOR
Moses J. Boggia
BY
Dean Fairbank & Hirsch
ATTORNEYS Patented Nov. 21, 1939

2,180,333

UNITED STATES PATENT OFFICE 2,180,333

LUGGAGE RACK

Moses J. Boggia, Corona, N. Y.

Application October 4, 1938, Serial No. 233,162

2 Claims. (Cl. 224—29)

Among the objects of the present invention are to provide a luggage rack for an automobile which may be conveniently carried in inobtrusive position in the trunk or tool compartment and which may be readily applied to and as readily removed from the automobile by a simple manipulation, without the need for any tool and which when thus applied affords a rigid structure for safe and secure mount even of heavy luggage.

Another object is to provide a rack of the above type devoid of hinges, screws, nuts, links, springs or any other part subject to movement or jamming, and which in fact involves but a small simple unitary inexpensive rigid, structure, no part of which is displaceable relative to any other part.

Another object is to provide a quick mountable and demountable luggage rack of the above type for use on the bumper, preferably the rear bumper of an automobile.

In the accompanying drawing in which is shown one of various possible embodiments of the several features of the invention, Fig. 1 shows a perspective rear view of an automobile with the luggage rack installed in position thereon, Fig. 2 is a fragmentary rear plan view of the automobile with the luggage rack installed, Fig. 3 is a transverse sectional view taken on line 3—3 of Fig. 2, Fig. 4 is a transverse sectional rear view of a fragment of the automobile, illustrating diagrammatically the manner of mounting the luggage rack and, Fig. 5 is a detail fragmentary view of one of the mounting hooks of the rack.

Referring now to the drawing, the luggage rack is particularly useful for mounting upon a bumper, preferably the rear bumper 10 of an automobile, where such bumper is equipped with the usual bumper guards 11. The bumper guards as shown are short convexly curved bars extending at right angles to the bumper, protruding thereabove and therebelow and may be rigidly but releasably attached in position by means of the same bolts and nuts 12 which attach the bumper itself to the structure. Further detailed description of this structure is not necessary as it is entirely conventional.

The luggage rack as best shown in Fig. 1 comprises a platform P extending rearward from the bumper and mounted in position thereon by a unitary compound hook made up of an upright hook 13 and a horizontal hook 14 continuous therewith. Hook 13 engages the outer edge of the bumper guard 11 and straddles the bumper 10 and hook 14, straddles the lower part of the bumper guard 11. The mounting hook conformation being a rigid part of the luggage rack structure, it will be seen that with the correlation of parts set forth, the luggage rack is rigidly secured to the bumper, and heavy luggage or other weights may be mounted thereon without any likelihood of the structure giving way. The downward stress of the luggage is applied at a fulcrum 15 at the rear edge of the rack where it engages the bumper and any tendency to rock about said fulcrum is effectively arrested by the engagement of hook 14 with the bumper guard 11.

In a preferred construction, the frame of the luggage rack is made up of a unitary length 16 of rod stock, preferably cylindrical as shown which is bent at 17 and 18 to form the U-shaped outline or frame of a rectangular platform comprising the base beam 25, and the lateral beams 26 and 27. The forward ends of the legs of the U-shaped frame are bent into the compound hook conformation previously described. This comprises a generally U-shaped hook 13 extending in the vertical plane of the lateral edges of the platform and a second U-shaped hook 14 unitary therewith forming therewith a compound hook, the latter hooks opening rearward and extending inward toward each other and lying in a plane parallel to that of the rack proper. In plan view of the rack, the hooks are lodged wholly within the rectangular frame and at the forward corners thereof as best shown in Fig. 2.

It will be understood that any type of frame structure either of sheet metal or wire mesh or braided structure may be affixed to the U-shaped frame set forth to form the platform proper. Illustratively, however, a platform is shown entirely of cylindrical rod stock which includes a rod 19 parallel to the base of the U-shaped frame, three transverse rods 20, 21 and 22 parallel to the legs of the U and at right angles to rod 19 and a shorter longitudinal rod 23 which may be curved as shown for clearance, and connects the inner ends of the transverse rods. The rods or segments thereof all lie in the same horizontal plane and at their points of junction are welded together into a strong unitary structure.

The widths of the mounting hook conformations and their spacing would, of course, depend upon the model or make of automobile for which the rack is intended.

The mode of installation of the luggage rack will be quite apparent from Fig. 4. The rack would be passed under the rear bumper, and its rear edge would be drawn upward between the bumper and the body to bring the outer hooks 14 into straddling relation with respect to the lower ends of the corresponding bumper guards 11, whereupon the rack would be tilted downward until the forward hooks 13 enter into snug straddling relation with respect to the bumper 11 as best shown in Fig. 1.

Preferably, as indicated, the platform does not extend its full width at the forward edge 23 but bays 28 are left between the legs 26—27 of the U-shaped frame and said rear edge. These bays serve for adequate clearance with respect to the automobile structure in the installation and removal of the rack.

It is understood that the construction of platform set forth while desirable is largely illustrative and that any of a wide variety of other structures which will readily suggest themselves to persons skilled in the art, could, within the scope of the invention be mounted on the U-shaped carrying frame.

It will also be understood that a platform of any desired construction may be used within the scope of the present invention, provided it is equipped at its forward edge with unitary mounting hook conformations substantially as claimed herein.

As many changes could be made in the above construction and many apparently widely different embodiments of this invention could be made without departing from the scope of the claims, it is intended that all matter contained in the above description or shown in the accompanying drawing shall be interpreted as illustrative and not in a limiting sense.

Having thus described my invention, what I claim as new and desire to secure by Letters Patent is:

1. The combination with an automobile of the type having a bumper with a pair of spaced bumper guards extending substantially at right angles to the length of the bumper, of a luggage rack, the latter comprising a platform having lateral hooks unitary and rigid therewith at its forward end, straddling said bumper and in contact with said bumper guards, each of said hooks having a further hook unitary therewith, in a plane at right angles thereto and straddling the lower portion of the corresponding bumper guard.

2. An automobile luggage rack comprising a generally rectangular platform having rigid with the forward end thereof a pair of lateral hooks, each hook being compound in conformation and including an upright hook element in the vertical plane of the corresponding lateral edge of the platform and a horizontal hook element continuous therewith and in a plane parallel to that of said platform, the hook conformations in plan view of the rack extending wholly within and at the forward corners of the rectangular platform whereby the rack may be applied to a bumper of the type equipped with spaced bumper guards extending at right angles thereto, by the upright hook elements being straddled over the bumper and the horizontal hook elements in back of the bumper guards.

MOSES J. BOGGIA.